March 15, 1955　　P. P. LOVE ET AL　　2,704,234

PLAIN BEARINGS

Filed Nov. 23, 1953

Inventors
Phil Prince Love
David Conrad Mitchell
by Pierce, Scheffler & Parker, attys United States Patent Office 2,704,234
Patented Mar. 15, 1955

2,704,234

PLAIN BEARINGS

Phil Prince Love and David Conrad Mitchell, Alperton, Wembley, England, assignors to The Glacier Metal Company Limited, Alperton, Wembley, England, a British company Application November 23, 1953, Serial No. 393,888

Claims priority, application Great Britain December 19, 1952

6 Claims. (Cl. 308—237)

This invention relates to plain bearing assemblages, such as journal bearing or thrust bearing assemblages, of the kind comprising a plain bearing element of metal of porous structure, or in which at least the working surface is of a porous, creviced or other suitably receptive nature, and in which poly-tetra-fluoro-ethylene is incorporated to provide a protective film extending over the metallic surface to enable the bearing to function effectively in the absence of normal lubrication and/or prevent damage in the event of temporary or partial failure of normal fluid lubrication.

It has been found that the effectiveness of bearings incorporating or impregnated with poly-tetra-fluoro-ethylene depends to a great extent on the character of the surface of the journal or other rotatable member with which the bearing is associated.

Under certain conditions of load and speed, there is a tendency for bearings incorporating or impregnated with poly-tetra-fluoro-ethylene to score a steel journal or associated rotatable element even if the surface thereof is hardened, and it is believed that this tendency to scoring is due to welding to the surface of the journal or rotatable element at local high spots of metal of the composite bearing structure which may become exposed.

The present invention has for its object to provide an improved plain bearing assemblage of the kind referred to whereby scoring of the surface of the journal or rotatable element, or other surface damage may be obviated.

According to the present invention, a plain bearing assemblage of the kind referred to comprises a plain bearing of metal incorporating or impregnated with poly-tetra-fluoro-ethylene in combination with a journal or other rotatable element the bearing surface of which is provided with a coating of lead. Poly-tetra-fluoro-ethylene undergoes transition at almost precisely the melting temperature of lead, i. e. about 327° C., and it is believed that it is this factor which inhibits welding at high spots.

The invention includes a plain journal bearing assemblage comprising an inner sleeve of steel, the outer surface of which is provided with a coating of lead, the said sleeve being adapted to be fitted on to a journal or the like, and an outer metal sleeve constituting a plain bearing and having poly-tetra-fluoro-ethylene incorporated, at least at the inner surface thereof.

The plain bearing element of the assemblage may be made in any suitable manner. In the case of a journal bearing assemblage, the bearing element may be in the form of a wrapped bush which may have an interlocked butt joint, or said bush may have an open butt joint and be fitted into a seamless housing sleeve which may be of greater dimension than the bush in the axial direction so as to leave annular spaces between the inner sleeve and the housing sleeve for the reception of dust-excluding means, such as rings of compressed felt or the like.

Prior to lead coating the working surface of the journal, inner sleeve or other rotatable member is preferably hardened as by case hardening. The coating of lead on the journal or other rotatable element may have a thickness of from 0.0002" to 0.005" and preferably is about 0.001" to 0.002" in thickness. The coating of lead may be applied by electro-deposition using a fluoborate or perchlorate bath or by hot dipping, or in any other suitable manner. Moreover, the dimensions of the assemblage preferably are such that, after assembly, there is a running clearance of from 0.0005" to 0.0015".

The invention is hereinafter described, by way of example, with reference to the accompanying diagrammatic drawings, in which.

Figure 1:
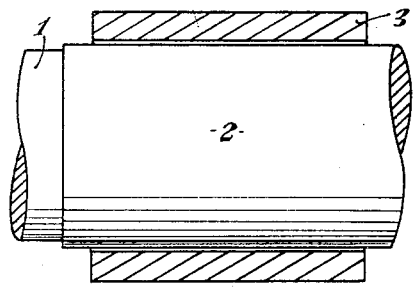
Fig. 1 is a longitudinal section illustrating one embodiment of plain bearing assemblage according to the invention.
Figure 2:
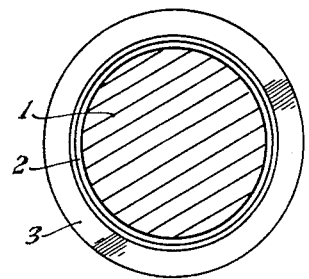
Fig. 2 is an end elevation corresponding to Fig. 1.

In carrying the invention into effect according to one embodiment and with reference to Figs. 1 and 2 of the accompanying diagrammatic drawings, a simple journal bearing assemblage comprises a steel journal or journal element 1 the working surface of which preferably is case hardened and is provided with a coating 2 of lead as by electrodeposition from a fluoborate or perchlorate bath to a thickness of about 0.001" to 0.002", and the lead-coated journal or journal element 1 is used in combination with a plain journal bearing 3 in the form of a sleeve of porous metal, e. g. produced by sintering copper powder, in which sleeve poly-tetra-fluoro-ethylene is incorporated by any suitable method to provide a protective surface film extending over the metal surface of the bearing 3.

Figure 3:
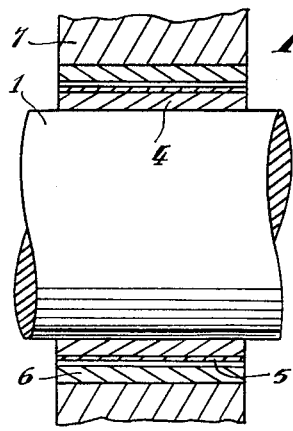
Fig. 3 is a longitudinal section illustrating a modification.
Figure 4:
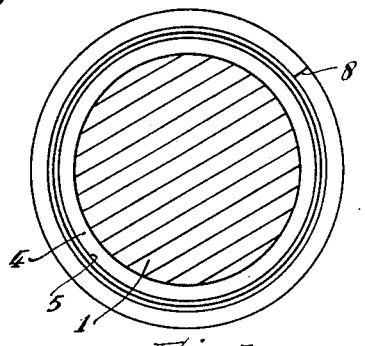
Fig. 4 is an end elevation of the bearing unit shown in Fig. 3.

As shown in Figs. 3 and 4 the invention may be applied to a bearing assemblage unit adapted to be fitted on to a journal or like element 1. The said unit may comprise an inner seamless hardened steel sleeve 4 provided with a coating 5 of lead in the manner before described and is used in combination with an outer sleeve 6 constituting the plain bearing, said outer sleeve comprising a porous metallic structure incorporating poly-tetra-fluoro-ethylene and being made, for example, by curving a blank into cylindrical form. The plain bearing element 6 of the assemblage may be adapted for insertion into a housing 7 in which it is supported, or may have an interlocked butt joint 8 (Fig. 4) so as to be self-supporting.

Figure 5:
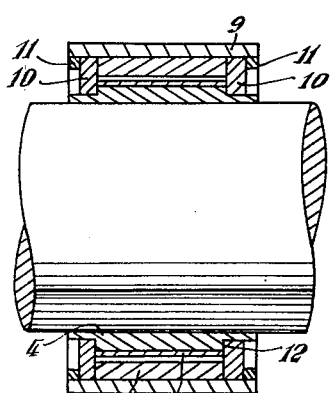
Fig. 5 is a view similar to Fig. 3 illustrating a further modification.
Figure 6:
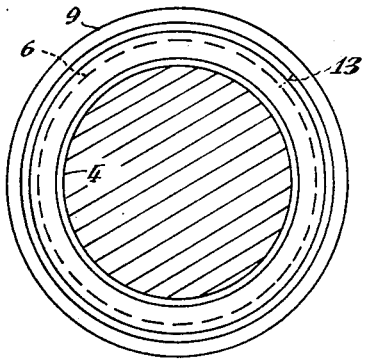
Fig. 6 is an end elevation of the bearing unit shown in Fig. 5.

In a further modification, as illustrated in Figs. 5 and 6, the plain bearing element 6 incorporating or impregnated with poly-tetra-fluoro-ethylene, and which may have an open butt joint as at 13, may be encased in an outer seamless housing sleeve 9 wide enough in the axial direction to house felt or like seals 10 for the exclusion of dust from the bearing surface, the said seals being located, for example, against shoulders 12 on the inner steel sleeve 4 as by means of rings 11 coacting with the housing sleeve 9.

It will be appreciated that a plain bearing assemblage, for instance, such as shown in Figs. 3 and 4, or Figs. 5 and 6, may be assembled as a complete unit ready for fitting on to a journal or the like and into a bearing housing.

It will be understood that the invention is not limited to the particular embodiments hereinbefore described. For example, the invention is applicable to thrust bearings or the like, in which case the co-operating surfaces are respectively coated with lead and impregnated and/or coated with poly-tetra-fluoro-ethylene.

What we claim is:

1. A plain bearing assemblage of the kind referred to, comprising a plain bearing of metal incorporating poly-tetra-fluoro-ethylene in combination with a rotatable element the bearing surface of which is provided with a coating of lead.

2. A plain journal bearing assemblage comprising an inner sleeve of steel, the outer surface of which is provided with a coating of lead, the said sleeve being adapted to be fitted on to a journal or the like, and an outer metal sleeve constituting a plain bearing and having poly-tetra-fluoro-ethylene incorporated, at least at the inner surface thereof.

3. A plain journal bearing assemblage according to claim 2, wherein the bearing element is in the form of a wrapped bush having an interlocked butt joint.

4. A plain journal bearing assemblage according to claim 2, wherein the bearing element is in the form of a bush having an open butt joint and is fitted into a seamless housing sleeve.

5. A plain journal bearing assemblage according to claim 4, wherein the said housing sleeve is of greater dimension than the bush in the axial direction and houses dust excluding rings.

6. A plain journal bearing assemblage according to claim 1, wherein the coating of lead on the rotatable element has a thickness of from 0.0002" to 0.005".

References Cited in the file of this patent

UNITED STATES PATENTS

| | | |
|---|---|---|
| 1,894,699 | Mitchell et al. | Jan. 17, 1933 |
| 2,121,277 | Albrecht et al. | June 21, 1938 |
| 2,266,319 | Hobbs | Dec. 16, 1941 |
| 2,427,730 | Latham | Sept. 23, 1947 |
| 2,600,079 | Scully | June 10, 1952 |

FOREIGN PATENTS

| | | |
|---|---|---|
| 657,080 | Great Britain | Sept. 12, 1951 |